United States Patent [19]
Moisin

[11] Patent Number: 6,107,750
[45] Date of Patent: Aug. 22, 2000

[54] CONVERTER/INVERTER CIRCUIT HAVING A SINGLE SWITCHING ELEMENT

[75] Inventor: Mihail S. Moisin, Brookline, Mass.

[73] Assignee: Electro-Mag International, Inc.

[21] Appl. No.: 09/146,859

[22] Filed: Sep. 3, 1998

[51] Int. Cl.$^7$ .................................................. H05B 37/02
[52] U.S. Cl. .................... 315/219; 315/307; 315/209 R; 315/224; 363/34; 363/37
[58] Field of Search .................................. 315/307, 219, 315/224, 247, 291, 119, 276, 209 R, DIG. 4, DIG. 5, DIG. 7; 363/34, 37; 323/222, 266

[56] References Cited

U.S. PATENT DOCUMENTS

| | | | |
|---|---|---|---|
| 3,808,481 | 4/1974 | Rippel | 318/139 |
| 4,115,729 | 9/1978 | Young et al. | 322/86 |
| 4,164,785 | 8/1979 | Young et al. | 363/50 |
| 4,270,164 | 5/1981 | Wyman et al. | 363/56 |
| 4,415,839 | 11/1983 | Lesea | 315/308 |
| 4,423,363 | 12/1983 | Clark et al. | 318/375 |
| 4,480,298 | 10/1984 | Fry | 363/28 |
| 4,489,373 | 12/1984 | du Parc | 363/56 |
| 4,507,698 | 3/1985 | Nilssen | 361/42 |
| 4,525,648 | 6/1985 | De Bijl et al. | 315/224 |
| 4,572,988 | 2/1986 | Handler et al. | 315/209 R |
| 4,608,958 | 9/1986 | Sakakibara et al. | 123/605 |
| 4,618,810 | 10/1986 | Hagerman et al. | 318/803 |
| 4,624,334 | 11/1986 | Kelledes et al. | 180/79.1 |
| 4,675,576 | 6/1987 | Nilssen | 315/242 |
| 4,682,083 | 7/1987 | Alley | 315/307 |
| 4,684,851 | 8/1987 | Van Meurs | 315/224 |
| 4,712,045 | 12/1987 | Van Meurs | 315/224 |
| 4,783,728 | 11/1988 | Hoffman | 363/37 |
| 4,818,917 | 4/1989 | Vest | 315/171 |
| 4,864,486 | 9/1989 | Spreen | 363/126 |
| 4,866,586 | 9/1989 | Suko | 363/5 |
| 4,870,327 | 9/1989 | Jorgensen | 315/307 |
| 4,899,382 | 2/1990 | Gartner | 379/413 |
| 4,952,853 | 8/1990 | Archer | 318/254 |
| 4,991,051 | 2/1991 | Hung | 361/57 |

(List continued on next page.)

FOREIGN PATENT DOCUMENTS

| | | |
|---|---|---|
| 0 478 388 A1 | 9/1991 | European Pat. Off. . |
| 0460641 | 12/1991 | European Pat. Off. . |
| 0522266 | 1/1993 | European Pat. Off. . |
| 0 578 575 A1 | 7/1993 | European Pat. Off. . |
| 0 642 295 | 3/1995 | European Pat. Off. . |
| 4010435 | 10/1991 | Germany . |
| 4032664 | 4/1992 | Germany . |
| 296 22 825 U | 4/1996 | Germany . |
| 63-002464 | 11/1988 | Japan . |
| 2204455 | 11/1988 | United Kingdom . |
| WO 90/01248 | 2/1990 | WIPO . |
| WO 92/17993 | 10/1992 | WIPO . |
| 9422209 | 9/1994 | WIPO . |
| 9535646 | 12/1995 | WIPO . |

OTHER PUBLICATIONS

Blanco, C. et al. "A Single Stage Flourescent Lamp Ballast With High Power Factor", Annual Applied Power Electronics Conference and Expositions (APEC), US, New York, IEEE, vol. Conf. 11, pp. 616–621.

Kazimierczuk, Marian et al. *"Resonant Power Converters"*, (1995), A Wiley–Interscience Publication, pp. 332–333.

"Simple Dimming Circuit for Fluorescent Lamp", IBM Technical Disclosure Bulletin, vol. 34, No. 4A, Sep. 1, 1991, pp. 109–111, XP000210848.

*Primary Examiner*—Haissa Philogene
*Attorney, Agent, or Firm*—Nutter, McClennen & Fish, LLP

[57] ABSTRACT

A circuit having a full bridge configuration with a single actively biased switching element. In one embodiment, the circuit is a ballast circuit having a full bridge inverter with one switching element. The bridge includes a diode coupled to the switching element such that the diode and the switching element are coupled between positive and negative rails of the inverter. The bridge further includes first and second capacitors coupled end to end across the positive and negative rails. The ballast circuit can be coupled to a rectifier/boost circuit having a boost inductor coupled to the inverter circuit.

29 Claims, 8 Drawing Sheets

U.S. PATENT DOCUMENTS

| | | | |
|---|---|---|---|
| 5,003,231 | 3/1991 | Perper | 315/291 |
| 5,004,955 | 4/1991 | Nilssen | 315/119 |
| 5,014,305 | 5/1991 | Moisin | 379/402 |
| 5,027,032 | 6/1991 | Nilssen | 315/103 |
| 5,052,039 | 9/1991 | Moisin | 379/402 |
| 5,063,339 | 11/1991 | Orii et al. | 318/696 |
| 5,081,401 | 1/1992 | Moisin | 315/324 |
| 5,124,619 | 6/1992 | Moisin et al. | 315/219 |
| 5,138,233 | 8/1992 | Moisin et al. | 315/187 |
| 5,138,234 | 8/1992 | Moisin | 315/209 R |
| 5,138,236 | 8/1992 | Bobel et al. | 315/209 R |
| 5,144,195 | 9/1992 | Konopka et al. | 315/94 |
| 5,148,087 | 9/1992 | Moisin et al. | 315/291 |
| 5,173,643 | 12/1992 | Sullivan et al. | 315/276 |
| 5,177,408 | 1/1993 | Marques | 315/291 |
| 5,191,263 | 3/1993 | Konopka | 315/209 R |
| 5,216,332 | 6/1993 | Nilssen | 315/224 |
| 5,220,247 | 6/1993 | Moisin | 315/209 R |
| 5,223,767 | 6/1993 | Kulka | 315/209 R |
| 5,256,939 | 10/1993 | Nilssen | 315/244 |
| 5,291,382 | 3/1994 | Cohen | 363/16 |
| 5,309,066 | 5/1994 | Ditlevsen | 315/205 |
| 5,313,143 | 5/1994 | Vila-Masot et al. | 315/209 R |
| 5,315,533 | 5/1994 | Stich et al. | 364/480 |
| 5,332,951 | 7/1994 | Turner et al. | 315/209 R |
| 5,334,912 | 8/1994 | Counts | 315/119 |
| 5,390,231 | 2/1995 | Hung et al. | 379/2 |
| 5,399,943 | 3/1995 | Chandrasekaran | 315/219 |
| 5,416,388 | 5/1995 | Shackle | 315/219 |
| 5,430,635 | 7/1995 | Liu | 363/37 |
| 5,432,817 | 7/1995 | Hormel et al. | 375/257 |
| 5,434,474 | 7/1995 | Ukita et al. | 315/128 |
| 5,434,477 | 7/1995 | Crouse et al. | 315/209 R |
| 5,434,480 | 7/1995 | Bobel | 315/224 |
| 5,444,333 | 8/1995 | Lau | 315/94 |
| 5,446,365 | 8/1995 | Nomura et al. | 320/14 |
| 5,481,160 | 1/1996 | Nilssen | 315/209 R |
| 5,493,180 | 2/1996 | Bezdon et al. | 315/91 |
| 5,504,398 | 4/1996 | Rothenbuhler | 315/209 R |
| 5,515,433 | 5/1996 | Chen | 379/398 |
| 5,563,479 | 10/1996 | Suzuki | 318/139 |
| 5,574,335 | 11/1996 | Sun | 315/119 |
| 5,579,197 | 11/1996 | Mengelt et al. | 361/93 |
| 5,583,402 | 12/1996 | Moisin et al. | 315/307 |
| 5,608,295 | 3/1997 | Moisin | 315/247 |
| 5,608,595 | 3/1997 | Gourab et al. | 361/79 |
| 5,638,266 | 6/1997 | Horie et al. | 363/132 |
| 5,684,683 | 11/1997 | Divan et al. | 33/65 |
| 5,686,799 | 11/1997 | Moisin et al. | 315/307 |
| 5,691,606 | 11/1997 | Moisin et al. | 315/307 |
| 5,798,617 | 8/1998 | Moisin | 315/247 |
| 5,821,699 | 10/1998 | Moisin | 315/291 |
| 5,825,136 | 10/1998 | Rudolph | 315/291 |
| 5,831,396 | 11/1998 | Rudolph | 315/307 |
| 5,866,993 | 2/1999 | Moisin | 315/307 |
| 5,925,986 | 7/1999 | Moisin | 315/247 |

CONVERTER/INVERTER CIRCUIT HAVING A SINGLE SWITCHING ELEMENT

CROSS REFERENCE TO RELATED APPLICATION

Not Applicable.

STATEMENT REGARDING FEDERALLY SPONSORED RESEARCH

Not Applicable.

FIELD OF THE INVENTION

The present invention relates generally to circuits for powering an electrical load and more particularly to a circuit having a full bridge configuration with a single switching element.

BACKGROUND OF THE INVENTION

There are many types of circuits for powering a load. One type of circuit for powering a load is an inverter circuit. An inverter circuit receives a direct current (DC) signal, from a rectifier for example, and outputs an alternating current (AC) signal. The AC output can be coupled to a load, such as a fluorescent lamp, or to a rectifier so as to form a DC-DC converter.

There are different types of inverter circuits which can have a variety of configurations. One type of inverter circuit known as a half-bridge inverter circuit includes first and second switching elements, such as transistors, coupled in a half-bridge configuration. Another type of inverter circuit referred to as a full-bridge inverter circuit includes four switching elements coupled in a full-bridge configuration. Half-bridge and full-bridge inverter circuits are typically driven at a characteristic resonant frequency determined by the impedance values of the various circuit elements.

For a resonant inverter, the current to the load periodically reverses direction. That is, the current flows through the load in a first direction for a first half of a resonant cycle and reverses direction after a period of time determined by the resonant frequency. The current then flows through the load in a second, opposite direction during a second half of the resonant cycle. For a half bridge inverter, the first switching element is conductive for the first half of the resonant cycle and the second switching element is conductive for the second half of the resonant cycle. And for a full bridge type configuration, first and second switching elements conduct for half of the resonant cycle and third and fourth switching elements conduct for the second half of the cycle.

To operate the circuit at or near resonance, the conduction states of the switching elements need to be controlled. Generally, each switching element is controlled by a respective control circuit. The control circuit typically biases each switching element to a conductive state for half of the resonant cycle and to a non-conductive state for the second half of the cycle. One type of control circuit includes an inductive bias element inductively coupled to a resonant inductive element through which current to the load flows. The bias element applies a potential to the switching element, such as to the base terminal of a bipolar junction transistor, for biasing the switching element to a conduction state that corresponds to a direction of current flow through the load. The switching element control circuits, as well as the switching elements themselves, can require significant space on a circuit board. It will be appreciated by one of ordinary skill in the art that, in general, space on a circuit board is at a premium.

It would be desirable to provide a circuit, such as an inverter circuit, that has a single switching element.

SUMMARY OF THE INVENTION

The present invention provides a circuit for driving a load including a full bridge topology having a bridge leg with a single actively biased switching element. Although the circuit is primarily shown and described as a ballast circuit having an inverter circuit, it is understood that the invention is applicable to other circuits and loads as well, such as power supplies and DC motors.

In one embodiment, a circuit has a full bridge configuration with a single actively biased switching element. The bridge includes first, second, third and fourth circuit elements coupled to a load. The first circuit element is coupled to the second circuit element such that a first circuit loop includes the first and second circuit elements and the load. The third circuit element is coupled to the fourth circuit element such that a second circuit loop includes the third and fourth circuit elements and the load. And a third, outer circuit loop includes the first, second, third and fourth circuit elements, one of which comprises the switching element.

In one particular embodiment, the circuit is a resonant inverter circuit including a diode coupled to a bridge switching element such that the diode is coupled to a positive rail of the inverter and the bridge switching element is coupled to a negative rail. The circuit further includes first and second bridge capacitors coupled end to end between the positive and negative rails of the inverter. The bridge switching element, the first bridge capacitor and the load form a first circuit loop and the diode, the second bridge capacitor and the load form a second circuit loop. And the diode, the bridge switching element and the bridge capacitors form a third or outer circuit loop.

In a further embodiment, the inverter circuit includes a discharge switching element coupled to the bridge switching element to reduce a transition time of the bridge switching element to a non-conductive state. In one particular embodiment, the bridge switching element is a field effect transistor (FET) and the discharge switching element is a bipolar transistor (BJT). The relatively rapid transition of the bipolar discharge transistor to a conductive state provides a path for energy in the FET bridge transistor to flow to a negative rail of the inverter thereby reducing the delay time of the FET.

In another embodiment, the inverter circuit includes a threshold detection circuit coupled to the bridge switching element for reducing the duty cycle of the bridge switching element when the energy level exceeds a predetermined level. In one embodiment, the threshold detection circuit includes at least one feedback resistor coupled to a threshold switching element. The threshold switching element is coupled to the bridge switching element for controlling the conduction state thereof. When the current through the feedback resistor increases to a level above a predetermined threshold, the threshold switching element transitions to a conduction state effective to cause the bridge switching element to switch to a non-conduction state.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
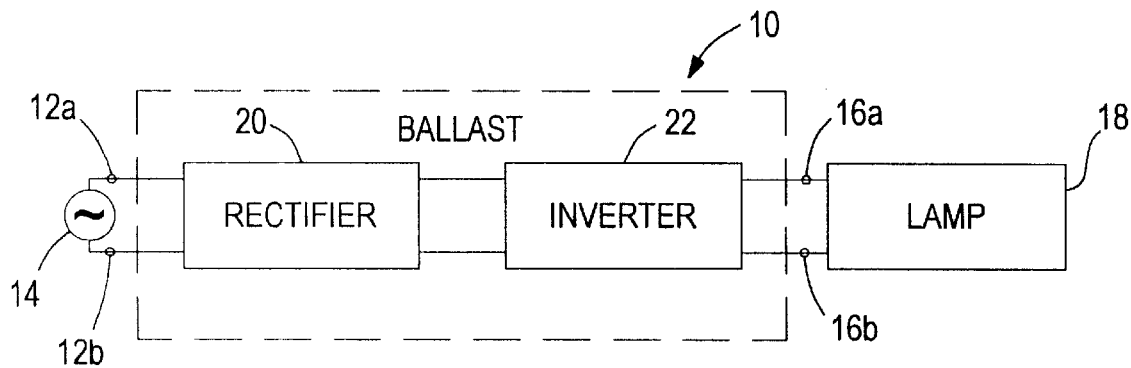
FIG. 1 is a schematic block diagram of a lamp system including a ballast circuit in accordance with the present invention, the ballast circuit having an inverter circuit.

FIG. 1 shows a ballast circuit 10 in accordance with the present invention. The ballast circuit 10 includes first and second input terminals 12a,b coupled to an alternating current (AC) power source 14 and first and second output terminals 16a,b coupled to a load 18, such as a fluorescent lamp. The ballast circuit 10 has a rectifier circuit 20 for receiving the AC signal and providing a direct current (DC) signal to an inverter circuit 22, which as described below, has a single actively biased switching element. The inverter circuit 22 energizes the lamp 18 with an AC signal that is effective to cause the lamp to emit light.

Figure 2:
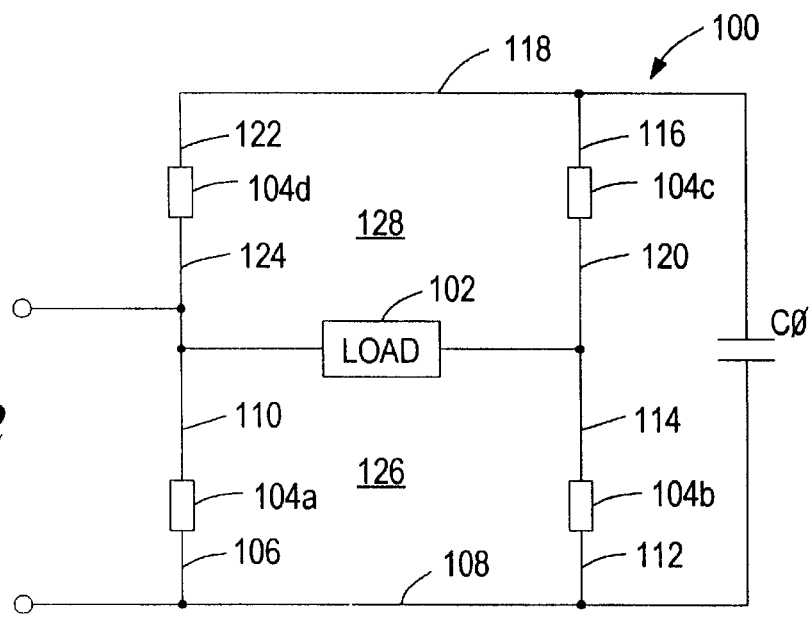
FIG. 2 is a schematic block diagram showing further details of the inverter circuit of FIG. 1.

FIG. 2 shows an exemplary embodiment of an inverter circuit 100, which can be used as the inverter circuit 22 of FIG. 1. The inverter 100 has a full bridge topology with a single actively bias switching element that, as described below, is effective to energize a load 102. The bridge includes circuit elements 104a–d, one of which is the actively biased switching element. A first bridge element 104a has a first terminal 106 coupled to a negative rail 108 of the inverter and a second terminal 110 coupled to the load 102. The second bridge element 104b has a first terminal 112 coupled to the negative rail 108 and a second terminal 114 coupled to the load 102 such that the load is connected between the second terminals 110,114 of the first and second circuit elements 104a,b. The third bridge element 104c, has a first terminal 116 coupled to a positive rail 118 of the inverter and a second terminal 120 coupled to the second terminal 114 of the second bridge element 104b. The fourth bridge element 104d has a first terminal 122 coupled to the positive rail 118 and a second terminal 124 coupled to the second terminal 110 of the first bridge element. The load 102, as connected in the circuit, divides the circuit into a first half 126 that includes the first and second bridge elements 104a,b and a second half 128 that includes the third and fourth bridge elements 104c,d. The circuit can also include a storage capacitor C0 coupled between the positive and negative rails 118,108 of the inverter.

It is understood that an actively biased switching element, as used herein, refers to a switching element having a terminal coupled to a circuit for the purpose of controlling a conduction state of the switching element. For example, the gate terminal 208 of the bridge switching element Q1 is coupled to the control circuit 210 for controlling the conduction state of the bridge switching element Q1. Thus, the bridge switching element Q1 is actively biased. In contrast, the bridge diode DB1 does not include such a control terminal and, therefore, is not an actively biased switching element.

Figure 3:
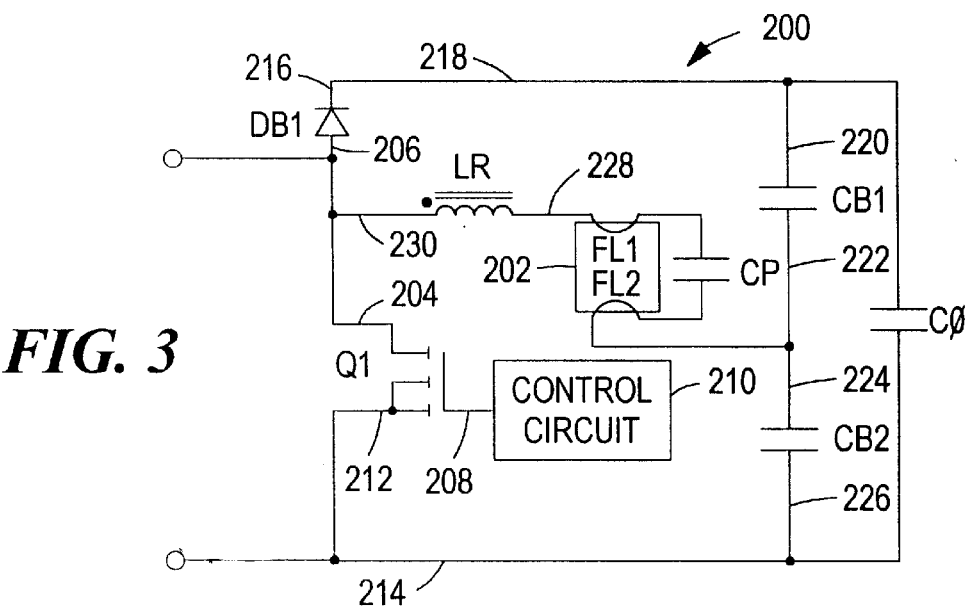
FIG. 3 is a circuit diagram of an exemplary embodiment of the inverter circuit of FIG. 2.

FIG. 3 shows an exemplary circuit embodiment of a full bridge inverter circuit 200 with a single actively biased switching element. The inverter circuit 200 includes a bridge switching element Q1, which is actively biased, a bridge diode DB1, and first and second bridge capacitors CB1,CB2. An exemplary value for the bridge capacitors CB1,CB2 is 0.1 microFarads. Coupled to the bridge is a resonant inductive element LR, a lamp 202 and a parallel capacitor CP. The bridge switching element Q1, shown as a field effect transistor (FET), has a first or drain terminal 204 coupled to an anode 206 of the bridge diode DB1, a second or gate terminal 208 coupled to a control circuit 210 and a third or source terminal 212 coupled to a negative rail 214 of the inverter. The anode 206 of the bridge diode DB1 is coupled to the switching element Q1 and a cathode 216 is coupled to a positive rail 218 to which a first terminal 220 of the first bridge capacitor CB1 is connected. A second terminal 222 of the first bridge capacitor CB1 is coupled to a first terminal 224 of the second bridge capacitor CB2 which has a second terminal 226 coupled to the negative rail 214 of the inverter. Coupled across the positive and negative rails 218,214 is a storage capacitor C0 which has an exemplary value of about 33 microFarads.

The lamp 202 includes first and second filaments FL1, FL2 across which the parallel capacitor CP is connected. The first filament FL1 is also connected to a first terminal 228 of the resonant inductive element LR and the second filament FL2 is also coupled to a point between the first and second bridge capacitors CB1,CB2. A second terminal 230 of the resonant inductive element LR is coupled to a point between the bridge diode DB1 and the bridge switching element Q1.

The circuit 200 is shown as a resonant inverter circuit having a characteristic resonant frequency determined by the impedance values of the various circuit elements, such as the resonant inductive element LR, the parallel capacitor CP and the lamp 202. When the circuit is driven at a frequency at or near the characteristic resonant frequency, the lamp 202 is energized with an AC signal that is effective to cause current to flow through the lamp and emit visible light. During a first half of a resonant cycle, current flows in one direction from the resonant inductive element LR to the lamp 202 and during the second half of the resonant cycle the current flows from the lamp 202 to the resonant inductive element LR. The current reverses direction after a time determined by the resonant frequency of the circuit. Operation of the exemplary circuit is described further in conjunction with FIGS. 4–4C.

Figure 4:
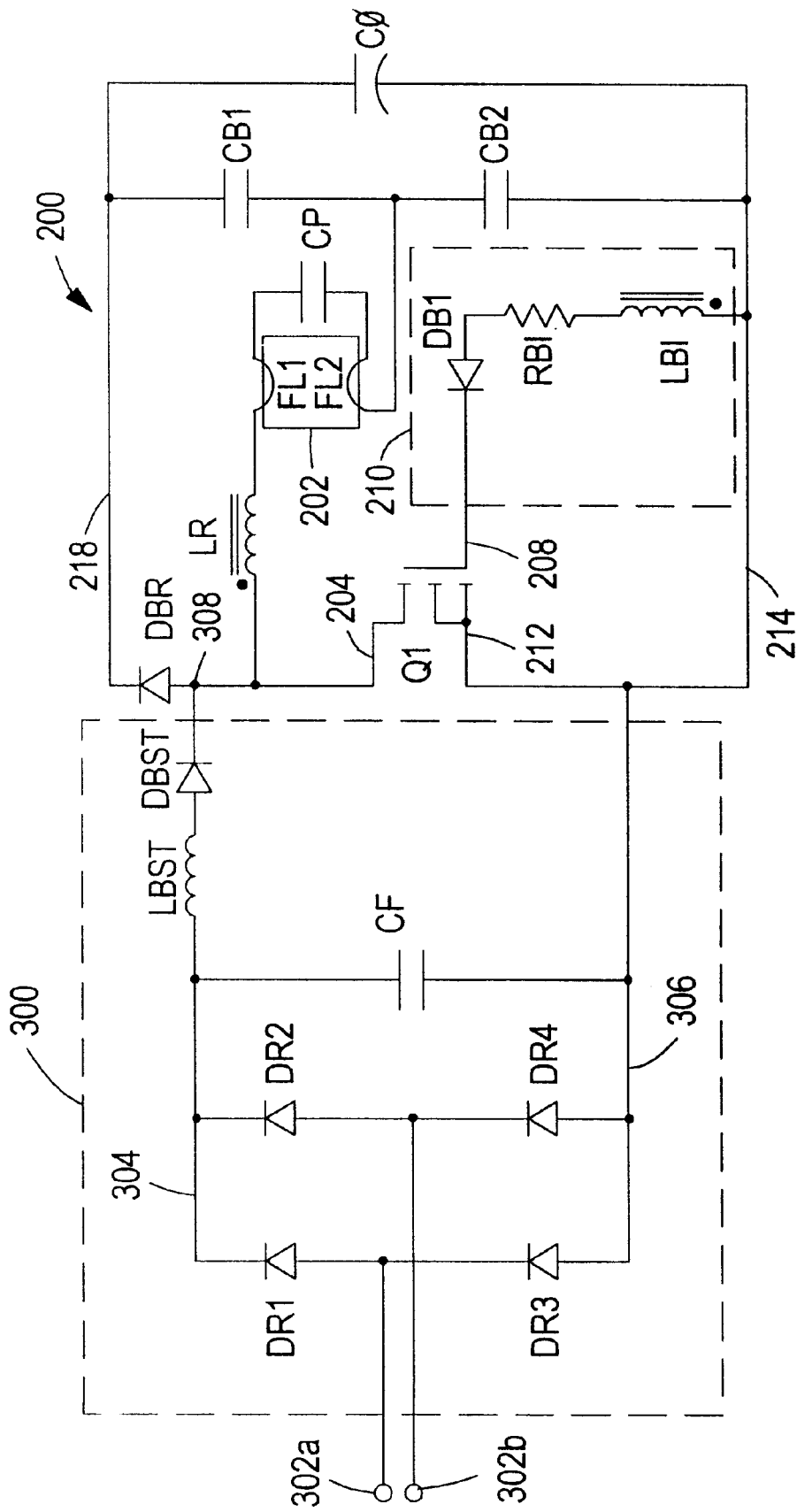
FIG. 4 is a circuit diagram showing further details of the circuit of FIG. 3.

FIG. 4 shows the inverter circuit 200 of FIG. 3 coupled to a rectifier/boost circuit 300, wherein like reference designations indicate like elements. An exemplary embodiment of the control circuit 210 is also shown. The rectifier/boost circuit 300 has first and second input terminals 302a,b for receiving an AC signal from an AC power source, such as the AC source 14 shown in FIG. 1. The AC signal is rectified by four rectifier diodes DR1–4 coupled in a bridge configuration to provide a positive output 304 and a negative output 306 across which a filter capacitor CF is coupled. A boost inductor LBST and a boost diode DBST are coupled in series between the positive output 304 of the rectifier and an input 308 of the inverter. The negative output 306 of the rectifier is coupled to the negative rail 214 of the inverter circuit. Operation of the rectifier/boost circuit 300 is well known to one of ordinary skill in the art. Suffice it here to say that the rectifier 300 receives an AC signal and provides a DC signal to the inverter 200 at terminals 200a,b.

The control circuit 210 controls the conduction state of the switching element Q1 and includes an inductive bias element LBI, a resistor RBI and a diode DBI coupled in series between the gate 208 of the FET Q1 and the negative rail 214 of the inverter. The bias element LBI is inductively coupled to the resonant bias element LR. The respective polarities of the bias element LBI and the resonant inductive element LR are indicated with conventional dot notation, as shown. As known to one of ordinary skill in the art, the dot corresponds to a rise in voltage from the unmarked end to the marked end. The polarities of the voltages (FIGS. 4A–C) at the respective marked and unmarked ends of the resonant and bias inductive elements LR,LBI are shown with a "+" to indicate a positive potential and a "−" to indicate a negative potential.

Figure 4A:
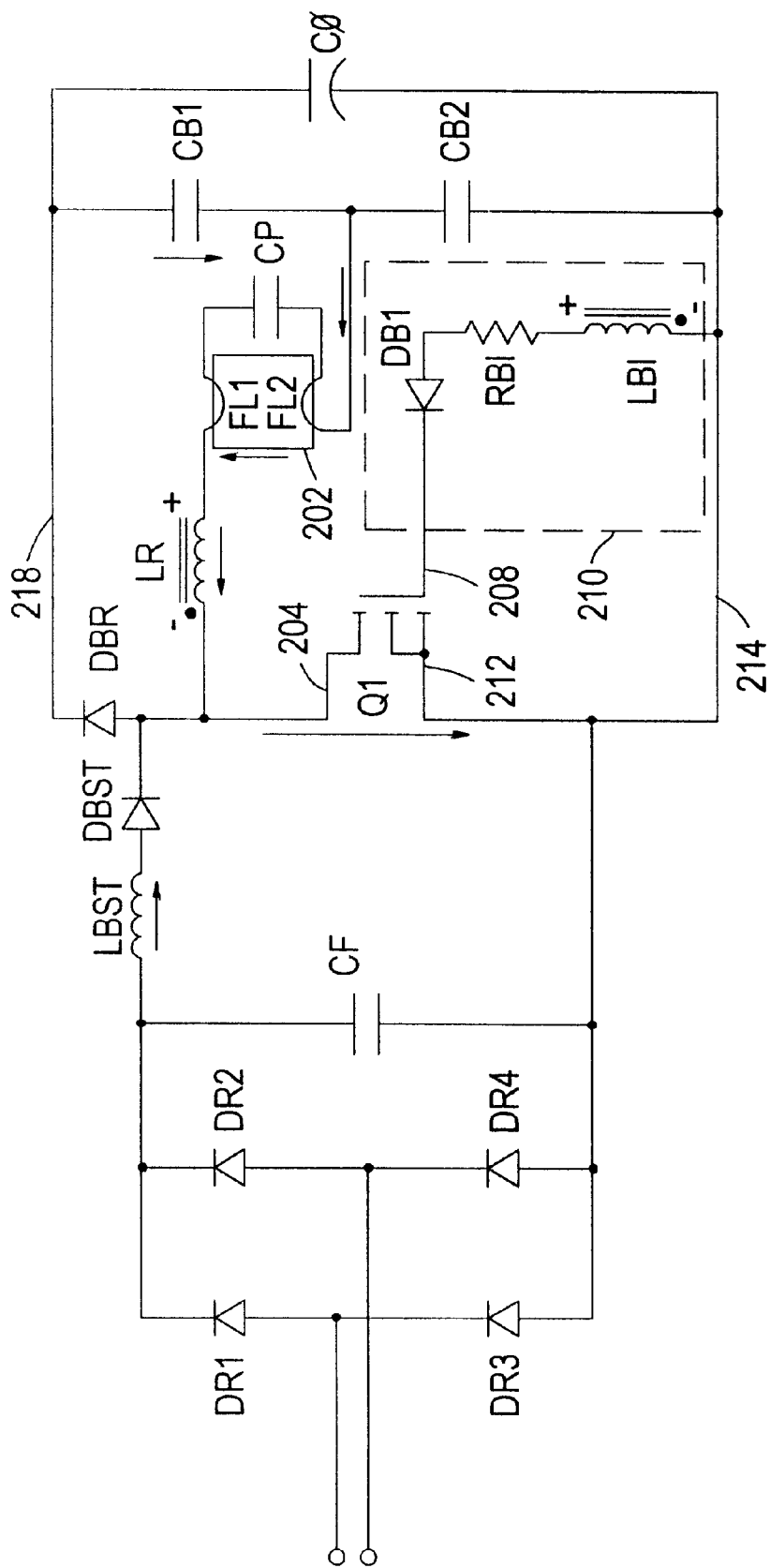
FIG. 4A is a circuit diagram showing energy flow through the circuit of FIG. 4 at a first time.
Figure 4B:
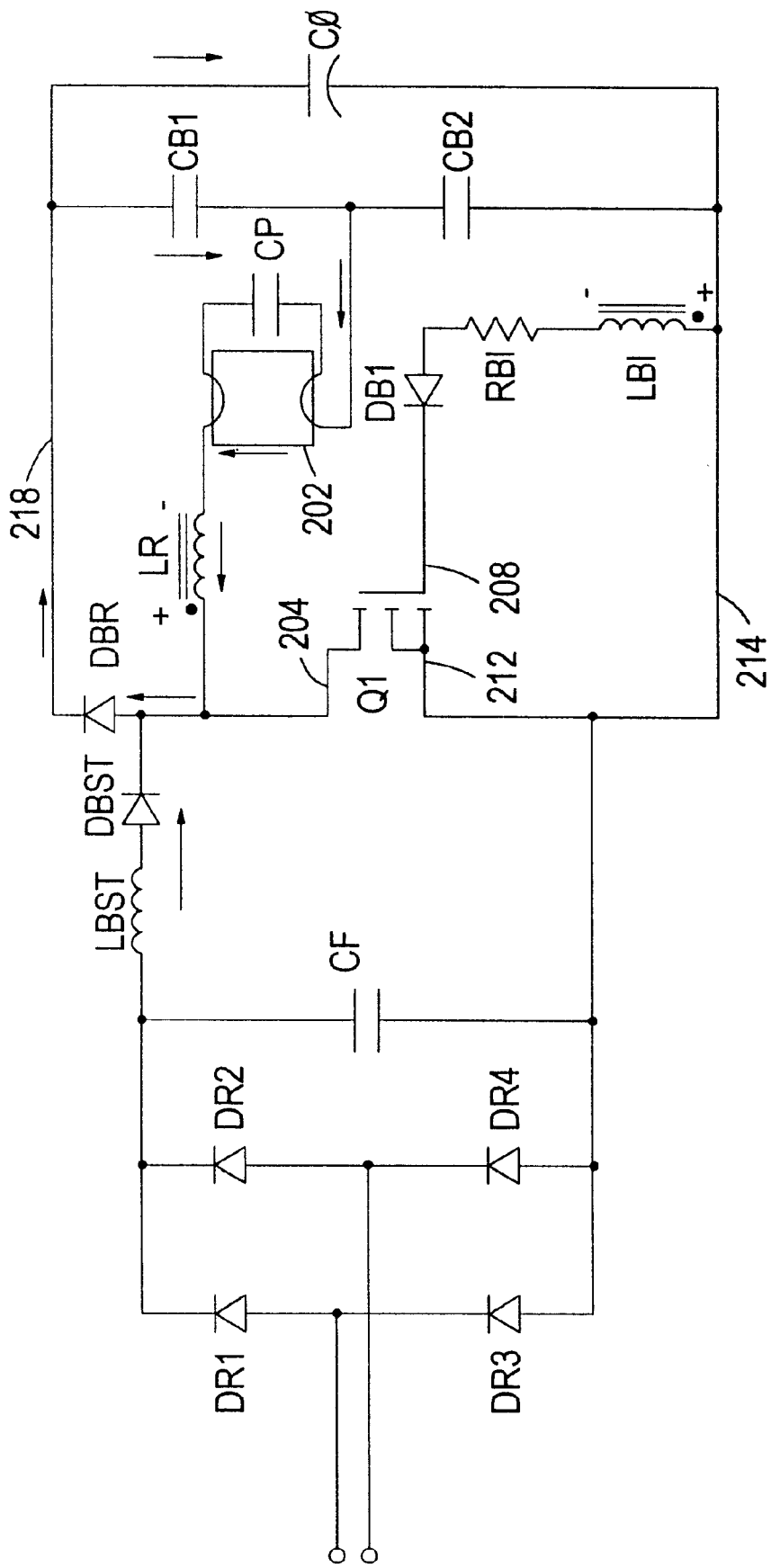
FIG. 4B is a circuit diagram showing energy flow through the circuit of FIG. 4 at a second time.
Figure 4C:
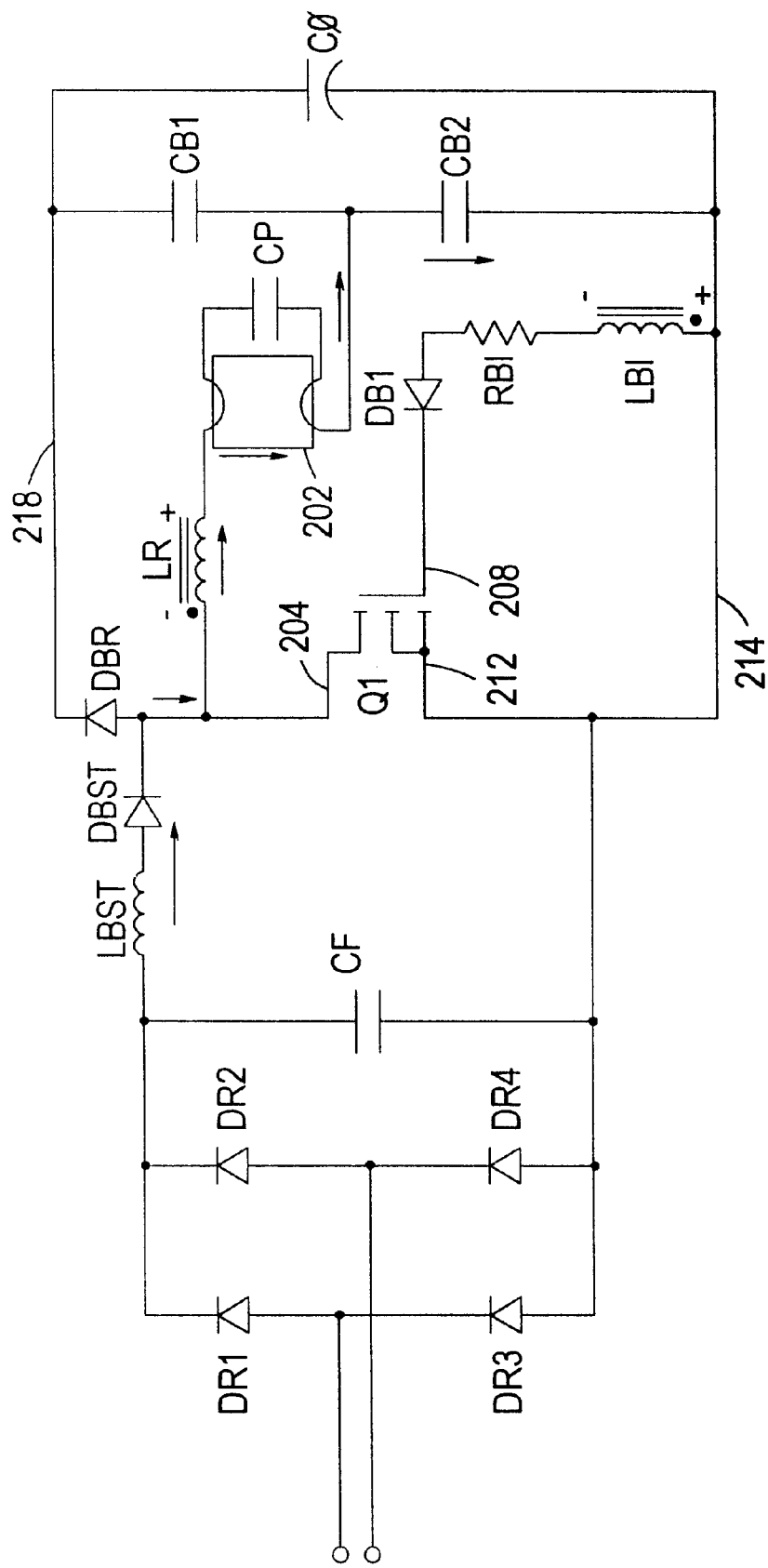
FIG. 4C is a circuit diagram showing energy flow through the circuit of FIG. 4 at a third time.

FIGS. 4A–C show the direction of current flow through the circuit at different times during resonant operation, as described below. FIG. 4A shows the direction of current flow through the rectifier and boost circuits 200,300 circuit as the switching element Q1 is ON. It is understood that, as used herein, the term ON refers to a conductive state of a switching element, such as a transistor, and that OFF refers to a non-conductive state of a switching element. Current is flowing in a direction from the lamp 202 to the resonant inductor LR. Current is also flowing through the boost inductor LBST from the rectifier and through the switching element Q1, as well as through the first bridge capacitor CB1 to the lamp 202. The direction of current flow is indicated by the arrows, as shown. As current flows through the resonant inductive element LR, the bias element LBI maintains the bias of the FET Q1 to its ON state by providing a potential to the gate terminal 208. And while the FET Q1 is ON, energy stored in the storage capacitor C0 and the boost inductor LBST from a previous cycle is transferred to the lamp 202.

After a time determined by the resonant frequency of the circuit, the current will reverse direction. However, since voltage leads current, the polarities of the potentials generated by the resonant and inductive elements LR,LBI switch before the current reverses direction.

As shown in FIG. 4B, after the voltage at the bias element LBI switches polarity, the switching element Q1 is biased to the OFF state. And after the resonant inductive element LR switches polarity, the bridge diode DBR is forward biased such that current now flows to the positive rail 218 of the inverter through the diode DBR and charges the storage capacitor C0.

FIG. 4C shows the circuit after the current switches direction such that it flows from the resonant inductive element LR to the lamp 202 and negative rail 214 via the second bridge capacitor CB2. Current no longer flows through the bridge diode DBR. And after a time determined by the resonant frequency, the voltages will switch polarity and bias the FET Q1 to the ON state and current will begin to flow through Q1, as described in FIG. 4A.

As described above, the conduction state of the bridge diode DBR is determined by the balance of currents flowing through the circuit elements. Thus, the diode DBR effectively operates as a switching element without the need for a control circuit. The bridge diode DBR also fixes a voltage at the junction of the boost and bridge diodes DBST,DBR to the voltage that appears across the positive and negative rails 218,214 of the inverter subject to the voltage drop (about 0.7 volts) across the bridge diode DBR when it is conductive.

The circuit also provides increased efficiency since energy flows directly to the lamp 202 from the rectifier when the bridge switching element Q1 is OFF. By contrast, in conventional bridge configurations, energy is stored in the circuit components during each half cycle which then flows to the load during the next half cycle.

Figure 5:
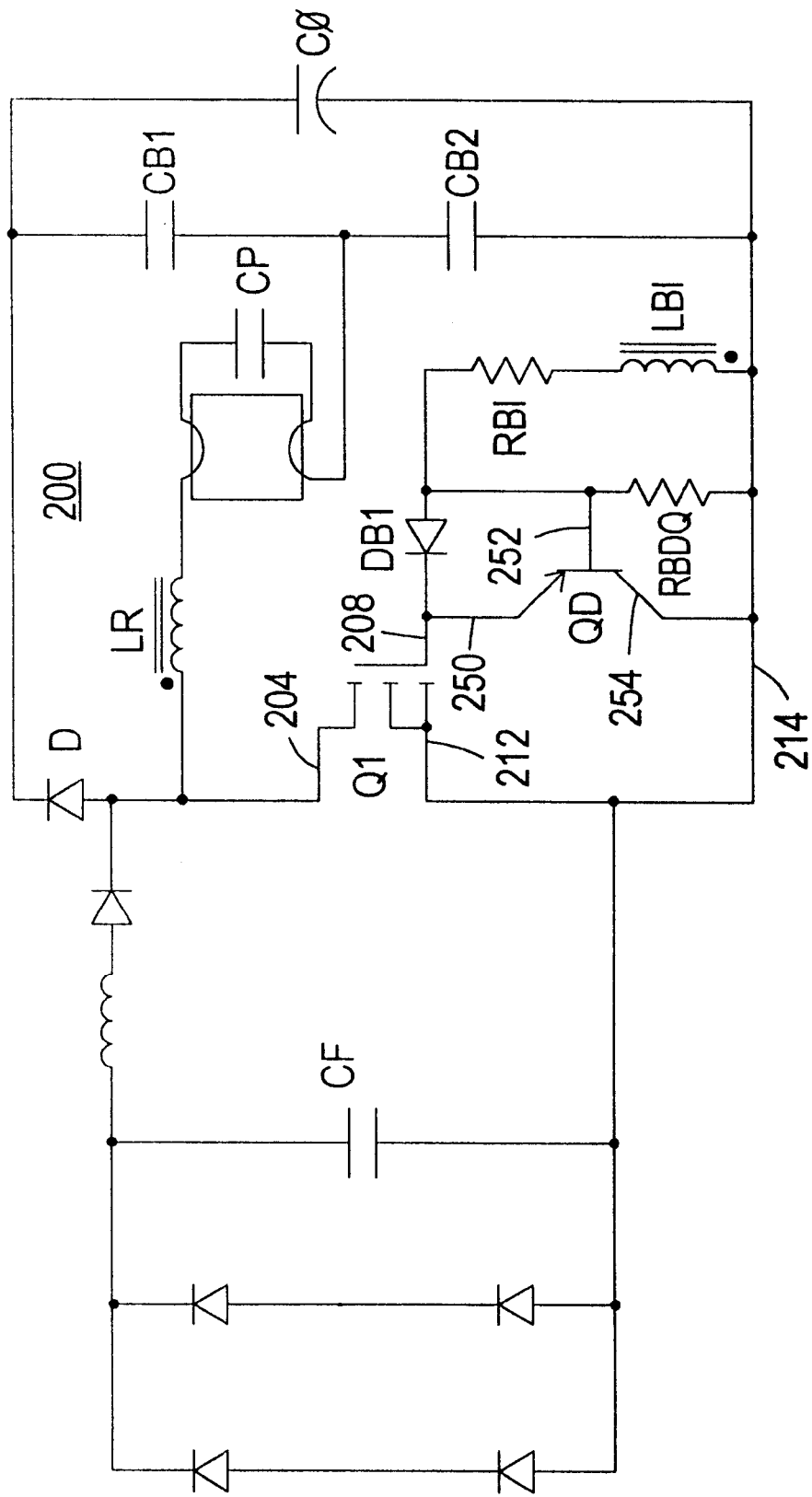
FIG. 5 is a circuit diagram of a further embodiment of a circuit in accordance with the present invention.

In a further embodiment shown in FIG. 5, the circuit 200 further includes a discharge switching element QD coupled to the bridge switching element Q1 for rapid switching thereof. In one particular embodiment, the discharge switching element QD is a pnp transistor having an emitter terminal 250 coupled to the gate terminal 208 of the FET Q1, a base terminal 252 coupled to the unmarked end of the bias element LBI via the resistor RBI, and a collector terminal 254 coupled to the negative rail 214. When the bias element LBI applies a negative potential to the gate terminal 208 of the FET Q1 to turn it OFF, the bias element LBI also biases the discharge transistor QD to a conductive state thereby providing a path for energy stored in the FET to discharge to the negative rail 214. This enhances the switching ability of the FET Q1 for a more rapid transition to the OFF state.

Figure 6:
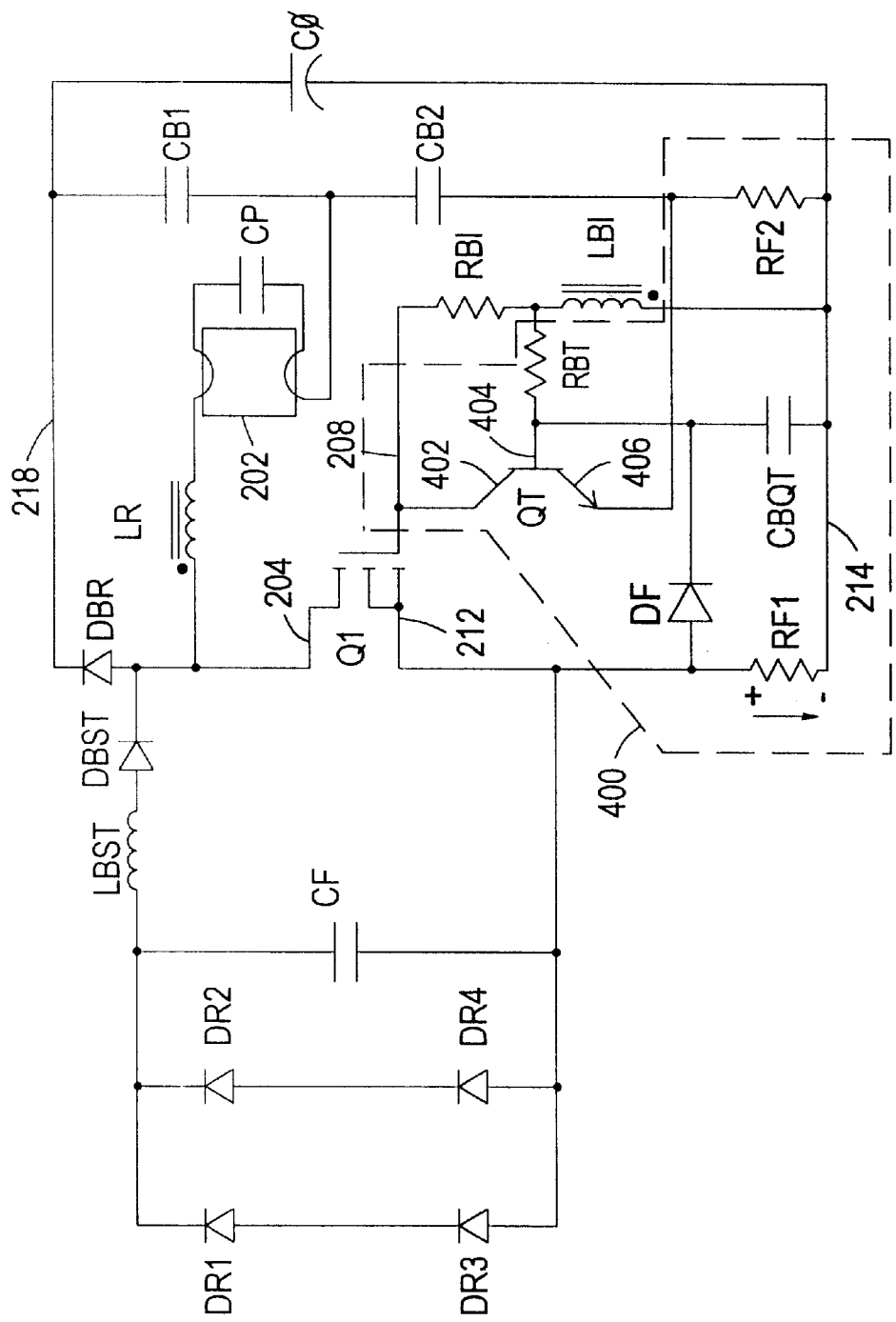
FIG. 6 is a circuit diagram of another embodiment of a circuit in accordance with the present invention.

In another embodiment shown in FIG. 6, the circuit 200 also includes a threshold detection circuit 400 for detecting a current level through the switching element Q1 that is greater than a predetermined threshold. Upon detecting an excessive power condition, the duty cycle of the switching element Q1 can be reduced or the circuit can be shut down.

In one embodiment, the threshold detection circuit 400 includes a threshold switching element QT, first and second feedback resistors RF1,RF2, a diode DF, and a base capacitor CBQT. The threshold switching element QT, shown as an npn transistor, has a collector terminal 402 coupled to the gate terminal 208 of the FET Q1, a base terminal 404 coupled to the unmarked end of the bias element LBI via a resistor RBT, and an emitter terminal 406 coupled to the negative rail 214 via the second feedback resistor RF2. The first feedback resistor RF1 is coupled between the source terminal 212 of the FET Q1 and the negative rail 214 such that current flowing from the FET Q1 flows through the first feedback resistor RF1. The second feedback resistor RF2 is coupled between the negative rail 214 and the second bridge capacitor CB2. The diode DF is connected between the source terminal 212 of the FET Q1 and the capacitor CBQT which is coupled between the negative rail 214 and the base terminal 404 of QT.

The threshold circuit 400 is effective to turn the FET Q1 OFF when the current through the FET Q1 exceeds a predetermined level. More particularly, when the threshold switching element QT is biased to a conductive state, the FET Q1 is turned OFF. A current flow through the FET Q1 generates a first voltage drop across the first feedback resistor RF1 which is applied to the base terminal 404 of the transistor QT via the diode DF. A voltage appearing at the bias element LBI also appears at the base terminal 404 of the threshold switching element QT. The emitter terminal 406 of the transistor QT is biased by a voltage drop across the second feedback resistor RF2 due to a current flowing from the negative rail 214 of the inverter. In general, when the current through the FET Q1 is greater than a predetermined threshold determined in large part by the impedance value of the first feedback resistor RFI, the transistor QT turns ON thereby turning the FET Q1 OFF. The circuit thereby limits the current through the bridge switching element Q1 so as to prevent excess signal levels from damaging the circuit.

Figure 7:
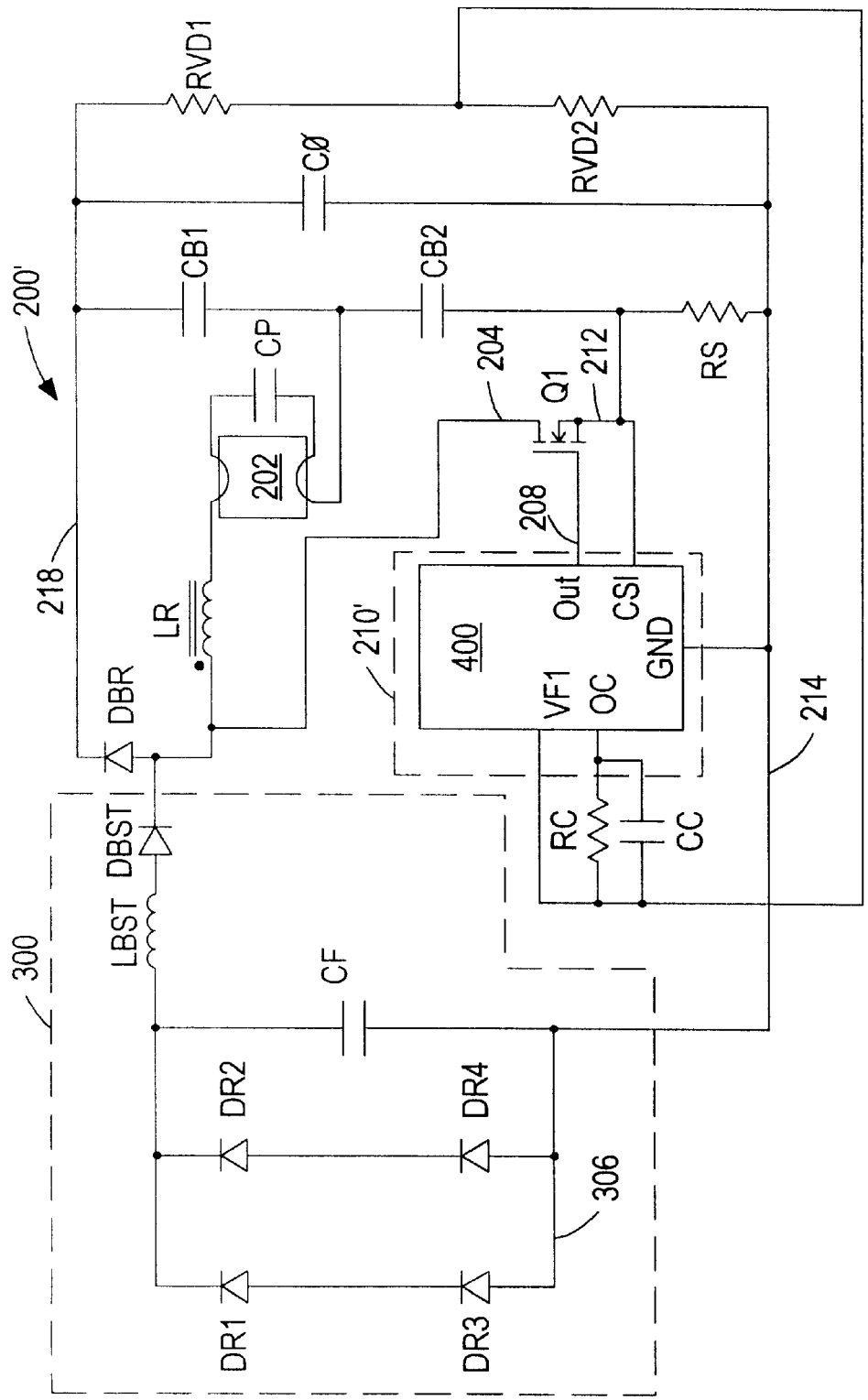
FIG. 7 is a circuit diagram of still another embodiment of a circuit in accordance with the present invention.

FIG. 7 shows a ballast circuit 200' having the control circuit 210' provided as an integrated circuit 400 which can be a current mode controller, such as those of the type manufactured by Motorolla Company of Schaumborg, Ill., and identified as UC2844, UC2845, UC3844 and UC3845. An output terminal OUT of the controller 400 is coupled to the gate terminal 208 of the FET Q1 for controlling the conduction state of the FET. The controller 400 includes a voltage feedback input terminal VFI connected to a point between first and second voltage divider resistors RVD1, RVD2 which are coupled end to end between the positive and negative rails 218,214 of the inverter 200'. Resistor RC and capacitor CC are coupled in parallel between the input terminal VF1 and an output compensation terminal OC of the controller to provide compensation to internal components of the controller 400. A reference terminal GND of the controller is coupled to the negative rail 214 of the inverter 200' and to a current sense input terminal CSI of the controller 400 via sense resistor RS. The CSI terminal is also coupled to the source terminal 212 of the FET Q1. The sense resistor RS is coupled between the second bridge capacitor CB2 and the negative rail 214 of the inverter 200'.

The controller 400 is effective to control the conduction state of the FET Q1 via the gate terminal 208 based upon the voltage detected between the voltage divider resistors RVD1,RVD2 and the voltage present across the sense resistor RS which corresponds to a level of current flow through the FET Q1. Current flow through the inverter 200' is as shown and described above in conjunction with FIGS. 4A–C.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A circuit for energizing a load, comprising:
    a first circuit element comprising a single actively biased switching element;
    a passively biased second circuit element coupled to the first circuit element such that the first and second circuit elements are adapted for coupling to the load, wherein said second circuit element is non-actively biased and a first circuit loop includes the first circuit element, the second circuit element and the load;
    a passively biased third circuit element for coupling to the load; and
    a passively biased fourth circuit element coupled to the third circuit element, wherein a second circuit loop includes the third circuit element, the fourth circuit element and load.

2. The circuit according to claim 1, wherein a third circuit loop includes the first, second, third, and fourth circuit elements.

3. The circuit according to claim 1, wherein the fourth circuit element includes a diode.

4. The circuit according to claim 1, wherein the second circuit element includes a capacitor.

5. The circuit according to claim 1, wherein the third circuit element includes a capacitor.

6. The circuit according to claim 1, wherein the second and third circuit elements are capacitors and the fourth circuit element is a diode.

7. The circuit according to claim 1, wherein the first, second, third, and fourth circuit elements provide a resonant inverter circuit having a full bridge topology.

8. The circuit according to claim 1, wherein the load includes a fluorescent lamp.

9. The circuit according to claim 1, wherein the load includes an inductive element, a capacitive element and a lamp.

10. The circuit according to claim 9, further including a control circuit coupled to the switching element for controlling a conduction state of the switching element, wherein the control circuit includes an inductive bias element inductively coupled to the inductive element.

11. The circuit according to claim 9, further including a control circuit coupled to the switching element for controlling a conduction state of the switching element, wherein the control circuit includes a current mode controller type integrated circuit.

12. The circuit according to claim 10, wherein the switching element is a field effect transistor and the control circuit is coupled to a gate terminal of the field effect transistor.

13. The circuit according to claim 12, further including a discharge transistor coupled to the gate terminal of the field effect transistor.

14. A circuit for energizing a load, comprising:
    a first circuit element comprising an actively biased switching element;
    a second circuit element coupled to the first circuit element such that the first and second circuit elements are adapted for coupling to the load, wherein a first circuit loop includes the first circuit element, the second circuit element and the load;
    a third circuit element for coupling to the load;
    a fourth circuit element coupled to the third circuit element, wherein a second circuit loop includes the third circuit element, the fourth circuit element and load; and
    a threshold detection circuit coupled to the switching element for reducing a duty cycle of the switching element when a current flowing through the switching element is greater than a predetermined threshold.

15. The circuit according to claim 14, wherein the threshold detection circuit includes a feedback resistor coupled to a threshold switching element wherein the threshold switching element biases the first circuit element to a non-conductive state when the current flowing through the feedback resistor is greater than a preselected level.

16. The circuit according to claim 1, wherein the circuit further includes a rectifier/boost circuit.

17. The circuit according to claim 16, wherein the rectifier/boost circuit includes a boost inductor.

18. A ballast circuit for energizing a lamp, the ballast circuit comprising:
    an inverter circuit including:
        first, second, third and fourth circuit elements coupled in a full bridge configuration wherein a single one of the first, second, third and fourth circuit elements is an actively biased switching element.

19. The circuit according to claim 18, wherein the switching element is a transistor.

20. The circuit according to claim 19, wherein the transistor is a field effect transistor.

21. The circuit according to claim 18, wherein the first circuit element includes the switching element, the second circuit element corresponds to a first capacitor, the third circuit element corresponds to a second capacitor, and the fourth circuit element corresponds to a diode.

22. The circuit according to claim 21, wherein the inverter circuit has positive and negative rails and the capacitors are connected end to end so as to form a series circuit path between the positive and negative rails.

23. The circuit according to claim 21, wherein the diode and the switching element are coupled so as to form a series circuit path between positive and negative rails of the inverter.

24. A ballast circuit for energizing a load including a full bridge inverter circuit having positive and negative rails, comprising:

a bridge diode having a cathode coupled to the positive rail and an anode;

a transistor having a first terminal coupled to the anode of the diode, a second terminal coupled to a control circuit and a third terminal coupled to the negative rail;

a first capacitor having a first terminal coupled to the positive rail and a second terminal; and a second capacitor having a second terminal coupled to the negative rail and a first terminal coupled to the second terminal of the first capacitor, wherein the first terminal of the transistor and the first terminal of the second capacitor are adapted for coupling to the load.

25. The circuit according to claim 24, wherein the load includes a lamp.

26. The circuit according to claim 25, wherein the load further includes an inductive element.

27. The circuit according to claim 24, further including a capacitor coupled between the positive and negative rails.

28. The circuit according to claim 24, further including a boost diode coupled to the bridge diode and a boost inductor coupled to the boost diode.

29. The circuit according to claim 28, further including a rectifier circuit coupled to the boost inductor and the negative rail of the inverter.

* * * * *